United States Patent [19]

Miller et al.

[11] Patent Number: 5,690,450
[45] Date of Patent: *Nov. 25, 1997

[54] APPARATUS FOR TRANSPORTING POWDER COATING MATERIAL FROM A BOX-SHAPED CONTAINER

[75] Inventors: William S. Miller, Wakeman; Kenneth Holley, South Amherst; John C. A. Traylor, Elyria, all of Ohio

[73] Assignee: Nordson Corporation, Westlake, Ohio

[*] Notice: The term of this patent shall not extend beyond the expiration date of Pat. No. 5,518,344.

[21] Appl. No.: 730,886

[22] Filed: Oct. 18, 1996

Related U.S. Application Data

[63] Continuation of Ser. No. 554,545, Nov. 7, 1995, abandoned, which is a continuation of Ser. No. 126,391, Sep. 23, 1993, Pat. No. 5,518,344, which is a continuation-in-part of Ser. No. 876,610, Apr. 30, 1992, abandoned.

[51] Int. Cl.⁶ ..................................... B65G 53/26
[52] U.S. Cl. ........................ 406/39; 406/134; 406/141
[58] Field of Search .................... 248/129, 146; 280/47.26, 47.27; 406/38, 39, 113, 117, 118, 134, 139, 141, 142, 143, 145, 151, 153, 164; 414/490

[56] References Cited

U.S. PATENT DOCUMENTS

| 2,286,776 | 6/1942 | Williams et al. | 406/142 |
|---|---|---|---|
| 3,854,634 | 12/1974 | Hart | 406/136 |
| 4,505,623 | 3/1985 | Mulder | 406/114 |
| 4,615,649 | 10/1986 | Sharpless | 406/138 |
| 5,015,126 | 5/1991 | Krämer | 406/152 |
| 5,271,695 | 12/1993 | Bischof et al. | 406/114 |
| 5,518,344 | 5/1996 | Miller et al. | 406/39 |

FOREIGN PATENT DOCUMENTS

| 2040383 | 10/1991 | Canada. |
| 0184994 | 6/1986 | European Pat. Off.. |
| 1913026 | 9/1970 | Germany. |
| 30286 | 3/1975 | Japan. |
| 2195975 | 4/1988 | United Kingdom. |

*Primary Examiner*—Andrew C. Pike
*Attorney, Agent, or Firm*—Howard M. Cohn

[57] ABSTRACT

A bulk unloader for emptying powder from an original box-shaped shipping container has a support platform with a cradle angularly mounted thereto for holding the container in a tilted position so that one of its corners is lower than the others. A vibrator, attached to the cradle, loosens the powder to facilitate movement of the powder towards the container's lowest corner. A pump connected to the outlet end of a hollow pick-up tube, having an inlet end positioned adjacent the container's lowest corner, draws powder from the container, into the inlet end of the pick-up tube, and then transfers the powder to a powder spray gun. The lower end of the pick-up tube is designed to prevent the plastic bag lining the shipping container from blocking the inlet end of the pick-up tube. A vibration dampening is provided between the cradle and the support platform to prevent vibrations from being transferred from the cradle to the support platform.

4 Claims, 5 Drawing Sheets

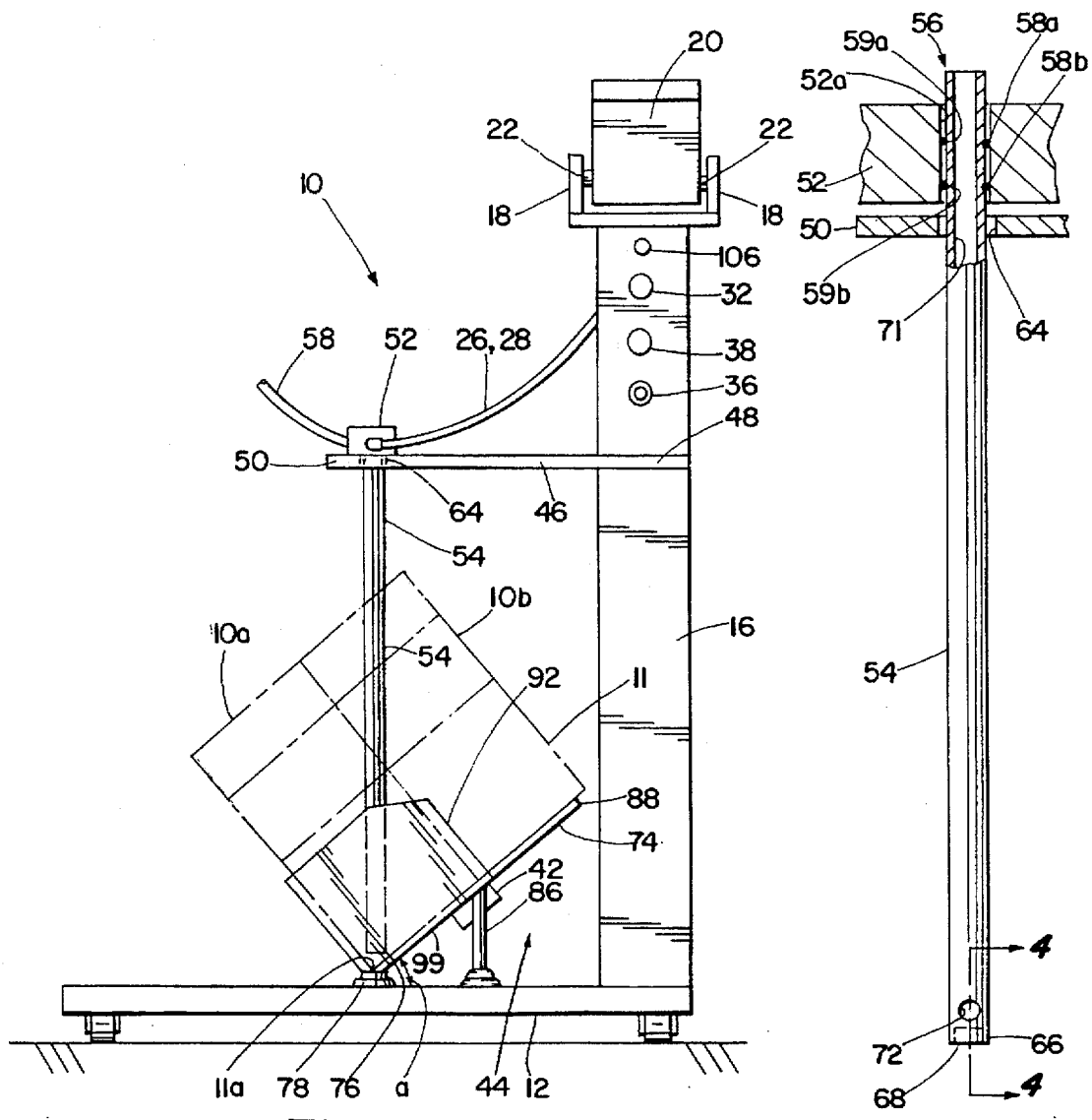
Fig. 2
Fig. 3
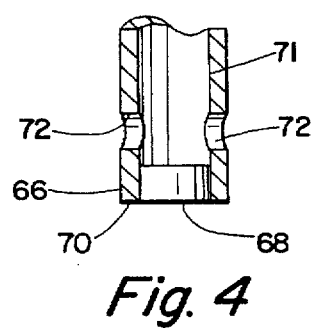
Fig. 4

APPARATUS FOR TRANSPORTING POWDER COATING MATERIAL FROM A BOX-SHAPED CONTAINER

This is a continuation of application Ser. No. 08/554,545 filed Nov. 7, 1995, now abandoned, which in turn is a continuation of application Ser. No. 08/126,391, filed on Sep. 23, 1993 (now U.S. Pat. No. 5,518,344), which in turn is a continuation-in-part of U.S. application Ser. No. 07/876,610, filed Apr. 30, 1992 (now abandoned).

BACKGROUND OF THE INVENTION

This invention relates to an apparatus and method for unloading powder from a shipping container. More specifically, the invention covers an apparatus and method for unloading powder coating material from a plastic liner within a box-shaped shipping container.

In electrostatic finishing with a powder coating material, the powder is typically delivered to a spray gun from a hopper. For example, the powder can be transferred from a shipping drum to a hopper associated with a powder spray system, as disclosed in U.S. Pat. No. 4,505,623, assigned to Nordson Corporation, the assignee of this invention. The U.S. Pat. No. 4,505,623, which is hereby incorporated by reference in its entirety, shows and describes the fluidization and withdrawal of the powder from a cylindrical shipping drum being supported with its axis at a 45-degree angle to vertical. The fluidized powder is then transferred to a feed hopper and pumped from the feed hopper to a spray gun for application to a substrate.

Alternatively to shipping powder in a drum, the original shipping container may also be a smaller container which is typically a square or rectangular cardboard box having an inner plastic liner, i.e., a plastic bag. Normally, the plastic bag is picked up out of the box and the powder is dumped from the plastic bag into the hopper which feeds the spray guns. Attempts have been made to transfer the powder directly from the box to the spray gun hopper or directly to a spray gun by means of a suction tube; however, various difficulties have been experienced with these prior attempts. For example, when the powder level is close to the bottom of the container, the powder tends to gets stuck in the folds of the plastic liner which then must be manually moved about to free the powder and direct it towards the suction tube, or alternatively, the suction tube must be moved to the location of the powder. During this manual procedure, the machine operator has to be careful that powder transfer from the container is not blocked by the plastic liner being sucked against the inlet of the suction tube. The problem of the plastic liner can occur whenever the powder level is near the bottom of the container and therefore the machine, even though it is intended as an automatic transport device, must be manned by an operator to ensure that substantially all of the powder is removed from the container. Moreover, if this type of a device is used to transport powder directly to a spray gun, rather than to an intermediate spray gun hopper, the powder flow through the gun can be very uneven, especially as the powder level is near the bottom of the box, even if the operator is carefully adjusting the bag and suction tube, which causes inferior powder coating.

OBJECTS AND SUMMARY OF THE INVENTION

In view of the foregoing, it is an object of the present invention to provide an apparatus and method for automatically unloading all of the powder from an original box type shipping container with a minimum of human operator attention.

It is a further object of the present invention to provide an apparatus and method for automatically unloading powder coating material directly from a box-shaped shipping container and delivering the powder directly to a powder spray gun without first passing it through an intermediate hopper.

It is a still further object of the present invention to provide an apparatus and method for automatically unloading powder coating material contained in a plastic liner within a box-shaped shipping container while preventing the liner from blocking the inlet opening of a vacuum pick-up tube which draws the powder from the shipping container.

It is a still further object of the invention to provide an apparatus for unloading powder coating material from a boxed-shaped shipping container which is easily transportable and simple and inexpensive to manufacture.

In accordance with the one preferred embodiment of the invention, an apparatus for unloading powder from a plastic liner within a box-shaped container is provided with a support platform and a cradle device mounted to the platform for supporting the box-shaped container so that a lower container corner is located closer to the support platform than the other container corners. A mechanism, associated with the cradle device, promotes the movement of the powder within the container towards the lower container corner. A component disposed within the container draws powder from the lower container corner and transfers the powder to a location external to the container.

Also, in accordance with the invention, an apparatus for unloading powder from a box-shaped container comprises a support structure and a cradle mounted to the platform for supporting the box-shaped container in a tilted position with respect to horizontal. The container has a lowermost interior portion in the tilted position which may be either an interior edge or interior corner. A pick-up tube having a lower end and at least one inlet opening is adapted to be positioned within the container in the lowermost interior portion. The pick-up tube has an upper outlet end for discharging powder. The lower end of the pick-up tube is closed and the inlet opening is positioned above the closed end. A device is provided for drawing powder from the container through the inlet opening of the pick-up tube and out of the upper end.

Further, in accordance with the invention, an apparatus for unloading powder from a box-shaped container comprises a cradle for supporting the container which is carried on a hand truck which further includes a rectangular basket for supporting the control unit of the apparatus in such a fashion that it is easily removed and replaced. The cradle positions one corner of the container lower than all the others and another corner of the container higher than all others. A bracket is installed on the highest corner to support a pick-up tube having a lower end installed in the lowest corner of the container.

Still further, in accordance with invention, a method of unloading powder from a plastic liner within a box-shaped container includes the following steps. The box-shaped container is supported in a tilted position to produce a lowermost interior portion of the container. Then, the powder within the container is moved towards the lowermost interior portion. Next, the powder is drawn from out of the lowermost interior portion of the container and transferred to a location external to the container.

According to another embodiment of the invention, the pick-up tube can be constructed of spaced inner and outer concentric tubes. The lower inlet end of the pick-up tube has at least one inlet opening in the outer tube, a vent hole in the outer tube, a closed lower end, and an upper outlet end of the pick-up tube for discharging powder. This pick-up tube draws powder from a container into the inlet end opening of the pick-up tube and simultaneously draws air through the vent hole. The air and powder are mixed to fluidize the powder and enhance discharge of the powder from the upper outlet end.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 2 is a back elevational view of the bulk unloader of the present invention taken along line 2—2 of FIG. 1;

FIG. 3 is an elevational view in partial cross section of a suction tube in accordance with the invention;

FIG. 4 is a view through line 4—4 of FIG. 3;

DESCRIPTION OF THE PREFERRED EMBODIMENT OF THE INVENTION

Figure 1:
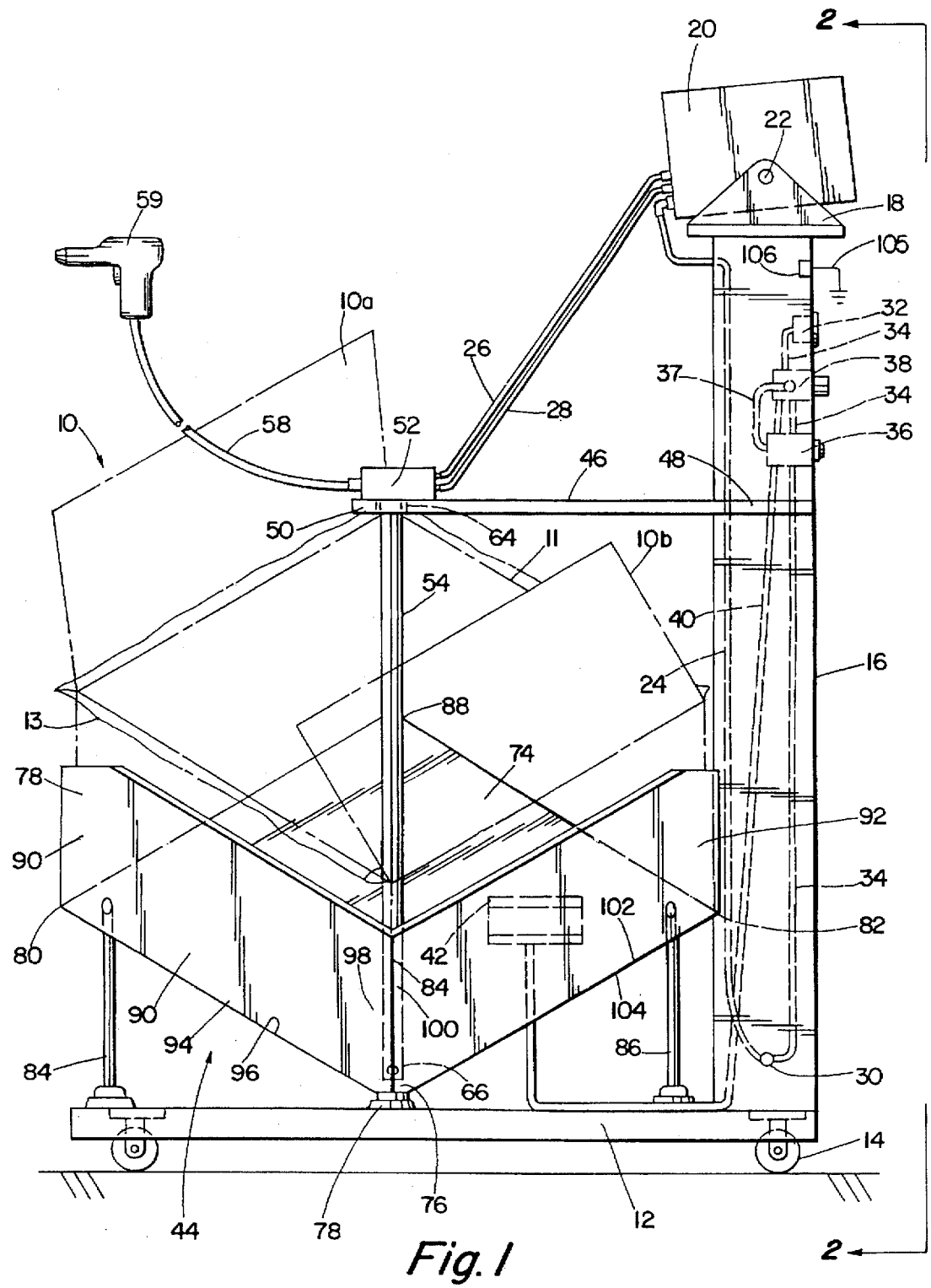
FIG. 1 is a side elevational view of a bulk unloader in accordance with the present invention.

Referring to FIGS. 1 & 2, there is illustrated a bulk unloader 10 in accordance with one preferred embodiment of the present invention for unloading an original shipping container 11 of coating material. Shipping container 11 is a rectangularly shaped box which can be of various sizes and contains about fifty pounds of spray powder in a plastic bag forming a plastic liner 13. For example, the side walls, top, and bottom of the box can typically be dimensioned anywhere from about 18 inches by about 18 inches to about 24 inches by about 24 inches. However, the specific size of the container 11 is not an integral part of the invention and the unloader can be sized to accommodate containers having a wide range of rectangular or square shapes and sizes.

The unloader 10 has a movable, support structure such as a rectangular support platform 12 with wheels 14 at each of its four corners. A hollow, vertical control housing 16 is preferably mounted at one corner of the platform 12. The control housing has two triangular support arms 18 mounted at the upper end of the housing.

A spray unit 20 is disposed between the support arms 18 and pivotally secured thereto by conventional means, such as pivot pins 22. An air supply line 24 is connected at one end to the spray unit 20. The spray unit 20 controls the air flow through air lines 26 and 28.

The control housing 16 has an air inlet 30 which is connected to a source of pressurized air, not shown. The inlet 30 delivers pressurized air into the air supply line 24. A gauge 32, connected to the air inlet 30 by an air line 34, indicates the pressure of the air delivered to the spray unit 20. The control housing also has an on/off switch 36 connected to a source of electrical power, not shown. An electrical line 37 carries electrical current from the switch 36 to a power regulator 38. The power regulator controls the amount of electrical current directed through a power line 40 to a vibrator 42 secured to the cradle 44 discussed hereinafter.

A support arm 46, connected at a first end 48 to the control housing 16, overlies the platform 12 and has a second end 50 located above the cradle 44, as discussed herein. A powder pump 52 is positioned at the second end 50 of the support arm 46. In the preferred embodiment, powder pump 52 is a Model 100 PLUS® pump manufactured by Nordson Corporation of Westlake, Ohio, although other powder pumps would also be suitable such as the one shown in U.S. Pat. No. 4,615,649 which is hereby incorporated by reference in its entirety. Such pumps typically include two pressurized air line inputs, such as the lines 26 and 28 of FIG. 1. Air line 26 would be the flow air line and is directly connected to the pumping chamber which draws powder up pick-up tube 54 into the pump 52. Air line 28, on the other hand, would be the diffuser air line and would be connected to the diffuser chamber of the pump to evenly mix, or diffuse, the powder within the air stream and to vary the ratio of air to powder which is pumped from the pump. Pick-up tube 54, in the present invention as will be described below, is removably attached to the powder pump 52. A feed line 58 carries powder coating material transported by pressurized air from pump 52 to a powder spray gun 59.

The pick-up tube 54 is removably attached to the pump 52 at its upper end 56, as seen in FIG. 3. Upper end 56 carries a pair of o-rings 58a, 58b which are received within a pair of grooves 59a, 59b, respectively. Upper end 56 first slides through hole 64 extending through end 50 of arm 46 and is then frictionally received within bore 52a in the bottom of pump 52, which is similar to bore 76 in support block 75 of the U.S. Pat. No. 4,615,649, by means of the compression of o-rings 58a, 58b between grooves 59a, 59b and bore 52a. O-rings 58a, 58b in this compressed state seal pick-up tube 54 to pump 52 against air leaks.

The lower inlet end 66 of the tube 54, as seen in FIGS. 3 & 4, has a plug 68 to close the open end 70 of the hollow bore 71 extending the length of tube 54. Inlet openings 72, extending through the walls of the tube 54, are disposed near the lower inlet end 66 and spaced slightly above the plug 68. While two openings 72 are illustrated, it is within the teachings of the invention to use any number of openings as required. The pick-up tube 54 is positioned to overlie the lower corner 76 of the cradle 44 in this preferred embodiment.

The cradle 44 has a substantially square base plate 74 secured at lower corner 76 to the platform 12 by a vibration damping isolation mount 78. Two opposite corners 80 and 82 of the base plate 74 are also connected to the platform 12 by vibration damping isolation mounts 84 and 86, respectively. The vibration damping isolation mounts 78, 84 and 86 are preferably constructed of an elastomeric material to prevent the transmission of vibrations generated by a vibrator 42 (later described) from the cradle 44 to the platform 12. While the upper corner 88 of the plate 74 is not illustrated as being connected to the platform 12, it is within the terms of the invention to provide a mounting between the plate and platform at upper corner 88, if desired.

The cradle 44 has two, substantially square side plates 90 and 92 which are mounted to the base plate 74 so as to project vertically upward from the base plate at a right angle thereto. Side plate 90 has a lower edge surface 94 which is attached along the length of edge surface 96 of the base plate 74. Side plate 90 has a side edge surface 98 which is abutted against and adjoined to a side edge surface 100 of the side plate 92. Side plate 92 has a lower edge surface 102 which is attached along the length of edge surface 104 of the base plate 74. The base plate 74 and two side plates 90 and 92 converge to form lower or cradle corner 76 and form the base and adjoining side walls of a partial cube.

The cradle 44 is supported by the isolation mount 78 on platform 12 so that lower corner 76 is positioned close to the platform 12. The plane through the base plate 74, as illustrated in FIG. 2, is preferably disposed at an angle "a" of about 25 to about 60 degrees to the platform 12, more preferably at an angle of about 30 to about 50 degrees and most preferably at an angle of about 40 degrees. The angle "a" of the cradle 44 to the platform 12 is important because it effects the movement of the powder towards the lower corner of the box which is received within lower corner 76 of the cradle, or towards the lowermost interior portion of box 11 in other embodiments of the invention. As the angle becomes smaller, the powder moves more slowly and finally too slowly towards the lower corner of the box. Conversely, as the angle becomes larger, the powder moves more quickly to the lower corner of the box and possibly too rapidly in some conditions.

An adjustable vibrator 42 is secured to the bottom surface 99 of the base plate 74 of the cradle. The vibrator is preferably a Model 1¼" SAM, manufactured by The Cleveland Vibrator Company of Cleveland, Ohio and is controlled by the electrical power regulator 38. While an electrical vibrator 42 has been employed in the presently preferred embodiment, a pneumatic vibrator could also be employed. Vibrator 42 loosens the powder and causes it to move and fall by gravity to the lowermost interior corner of the box located in lower corner 76 of cradle 44.

In operation, an original shipping container 11, i.e., a box, shown in phantom lines in FIGS. 1 and 2, containing a plastic liner 13 filled with a powder coating material, is positioned on the angled cradle 44 so that the bottom of box 11 is supported by the base plate 74 and two sides of box 11 rest against the side plates 92 and 94. Because of the angle of cradle 44, box 11 easily slides across the base plate 74 into the desired position. Original shipping boxes for powder coating material, while being typically rectangular, have a wide range of sizes. All of the typically sized shipping boxes can be securely received within cradle 44 of the present invention, and held there firmly by their own weight, even if the walls or top of the box project past the free edges of the bottom or side plates of cradle 44.

Once box 11 is in cradle 44, the top flaps 10a and 10b of the box 11 are opened, as illustrated in FIGS. 1 & 2, and the pick-up tube 54 is inserted through hole 64 in end 50 of arm 44, into the top of the box and down through the powder until lower inlet end 66 hits the lowest corner 11a of box 11 resting in lower corner 76 of cradle 44. Pump 52 is now installed onto the upper end 56 of pick-up tube 54, with o-rings 58a, 58b sealing against inlet bore 52a of pump 52. The vibrator 42 is turned on and adjusted by regulator 38 so that cradle 44 vibrates to loosen the powder contents of box 11 so that with the aid of gravity, the powder is continuously urged downwardly toward the lower inlet end of pick-up tube 54 in lower corner 11a of box 11. The isolation mountings, connecting cradle 44 to the platform 12 of the bulk unloader 10, significantly reduce the transfer of vibrations to the platform 12. This is important because it localizes the effects of the vibrator in the powder contents of box 11 and reduces the energy requirements necessary to accomplish the loosening and movement of the powder in box 11.

The spray unit 20 is then operated by suitable controls (not shown) to turn on vacuum pump 52 by providing pressurized air through lines 26, 28. As mentioned above, air line 26 creates a vacuum condition within a vacuum chamber in pump 52. Pick-up leg 54 is sealed against pump bore 52a and connected to this vacuum chamber so that the vacuum is transferred down hollow pick-up leg 54 and draws powder up and out of box 11 through the inlet openings 72 in the lower end 66 of tube 54. The powder flowing up tube 54 is drawn through pump 52 where it mixes with pressurized air from supply lines 26, 28 and is pumped directly into the feed line 58 for delivery to a spray gun 59. Alternatively, feed line 58 could deliver the powder to a spray gun hopper (not shown) which would in turn deliver it to spray gun 59.

As the powder is removed from box 11, a pocket or void tends to form at the bottom corner 11a of box 11 around the lower end of tube 54. The continuous vibration of cradle 44 and box 11 causes the powder to move towards the lowest, bottom corner 11a of box 11 and to continuously fill up the pocket as the incoming powder is being removed.

While the above described operation of the machine is very effective to automatically unload original shipping containers and transfer the powder to a spray gun, the preferred embodiment includes a guard at the inlet end of the pick-up tube to prevent the plastic liner from covering the inlet holes 72 of the pick-up tube 54. That is, when the powder level in the box is very low, i.e., the powder is almost emptied from the box, the plastic liner 13 is no longer pressed against the inner walls of the box by the powder and tends to collapse into the box and cover the inlet holes 72, especially because of the influence of existing vacuum at inlet holes 72. Without the guard of the present invention, the collapse of the liner results in the machine operator having to manually hold plastic liner 13 away from tube 54 or having to replace the boxes of powder more frequently and transferring the left over powder to the new box, both dirty and time consuming operations which reduce the ease and profitability of the finishing process.

The construction of the pick-up tube 54, with a closed bottom end 66 and inlet holes 72 in the sides thereof above closed end 66, is a significant aspect of the invention and overcomes the problem just mentioned. The closed bottom of tube 54 is used as a guard to hold the plastic liner 13 of the box away from inlet holes 72. That is, bottom inlet portion 70 of tube 54 prevents plastic liner 13 from collapsing inwardly towards the holes 72 to such an extent that the plastic liner 13 blocks the inlet holes 72 and disrupts the powder flow up pick-up tube 54.

In the embodiment illustrated in FIGS. 1 & 2, pump 52, support arm 46, control housing 16, and support platform 12 could become electrically charged by triboelectric or frictional charging caused by powder flow through the internal plastic parts within pump 52, and through pickup tube 54 which is typically plastic. That is, if the unit were not grounded, the static charge would be transferred from the pickup tube and pump to all metal components in contact with the pump. To avoid this problem, the support platform 12 is electrically grounded to control housing 16 by means of metal-to-metal contact between them, and control housing 16 is in turn grounded by a ground strap 105 connected at one end to a grounding lug 106 and at the other end to any suitable ground such as the powder coating booth by a removable spring clip (not shown) at the end of strap 105. In this way, support arm 46 is grounded by control housing 16 and pump 52 is grounded by arm 46 due to metal-to-metal contact between them.

Having described one preferred embodiment of the invention, the alternative embodiment of the invention, shown in FIGS. 5 and 6, will now be described.

As in FIGS. 1 and 2, the box 11 in the alternative embodiment is held with one corner lower than all of the others. Again, the box is held by a cradle 44a which is very similar to cradle 44 and cradle 44a is vibrated by a vibrator 42a which is similar to vibrator 42. The device is equipped with a control unit 110 which includes all the functions of spray unit 20 and would additionally include gauge 32, on/off switch 36 and power regulator 38 (not shown in FIG. 5). A source of pressurized air (not shown) for pump 52 and an electric power line (also not shown) for vibrator 42a would be connected directly to control unit 110.

Note that control unit 110 is placed in a rectangular basket 111 which is supported by frame members 113 of the hand truck type support structure 112. With this design, if there is any failure in control unit 110, it can be easily replaced with a new or rebuilt control unit with little or no downtime for the unit. Hand truck 112 supports cradle 44a which in turn supports box 11 at an approximate 45 degree angle. Frame members 113 join to form a handle 114. Hand truck 112 also includes wheels 116 and a support pad 118. The design of this alternative embodiment of the invention is much more readily transportable than the design of the FIG. 1 embodiment, since to move the unit the operator simply pushes down on handle 114 to elevate support pad 118 above the floor to wheel the unit to any desired location within the plant.

Figure 5:
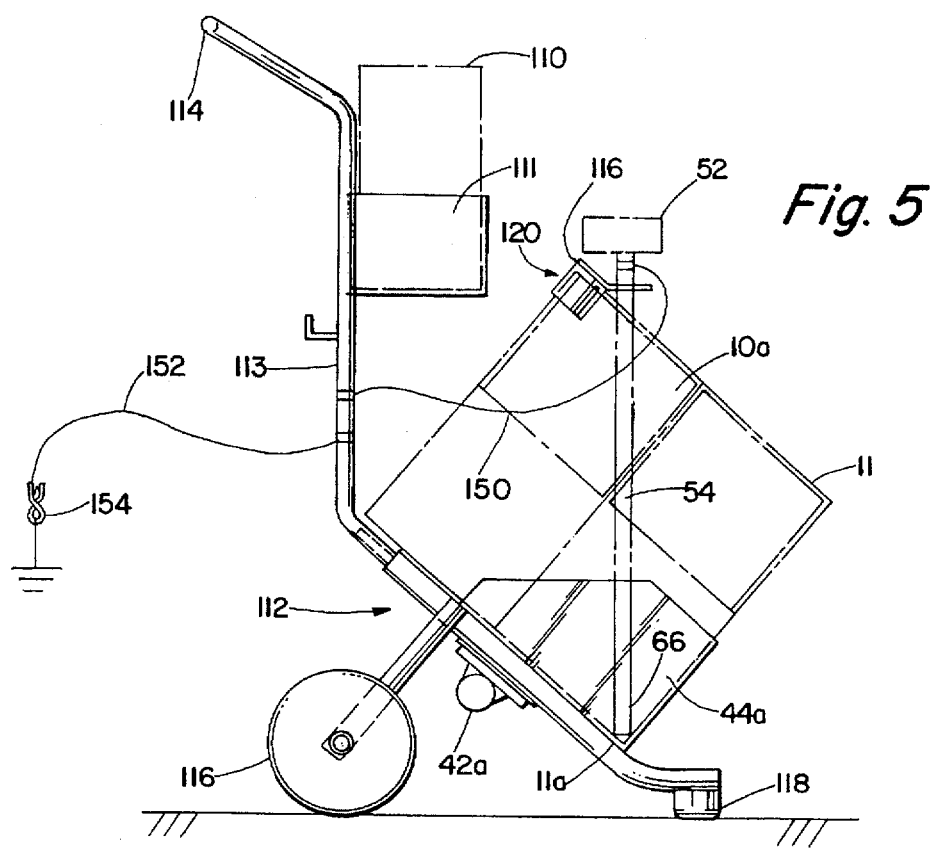
FIG. 5 shows a side, elevational view of an alternative embodiment of the invention.
Figure 6:
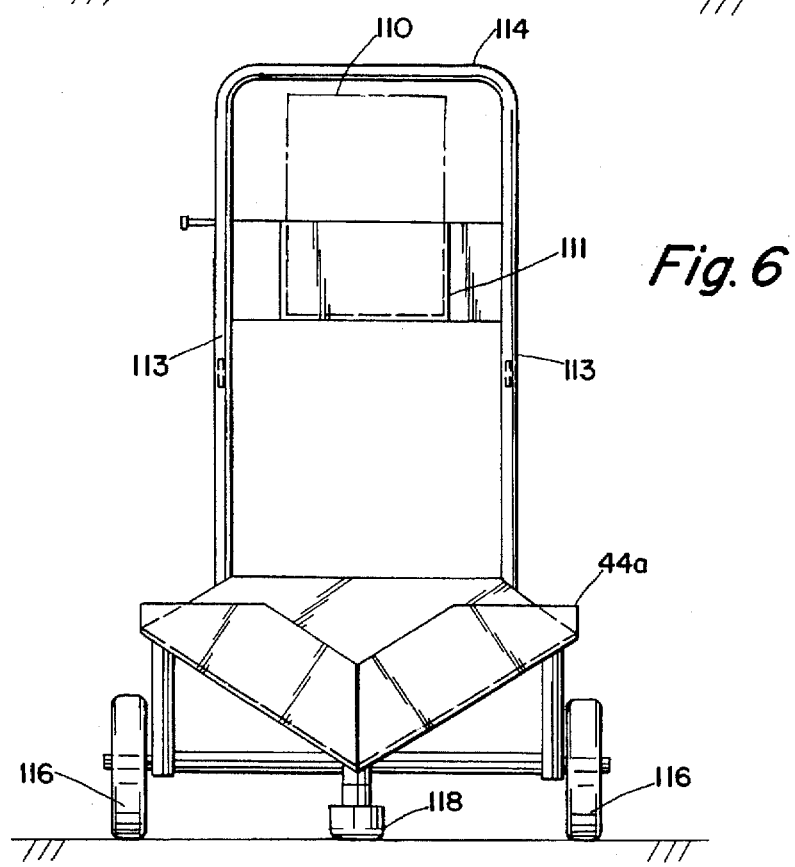
FIG. 6 shows a front, elevational view of the hand truck employed in the FIG. 5 embodiment.
Figure 7:
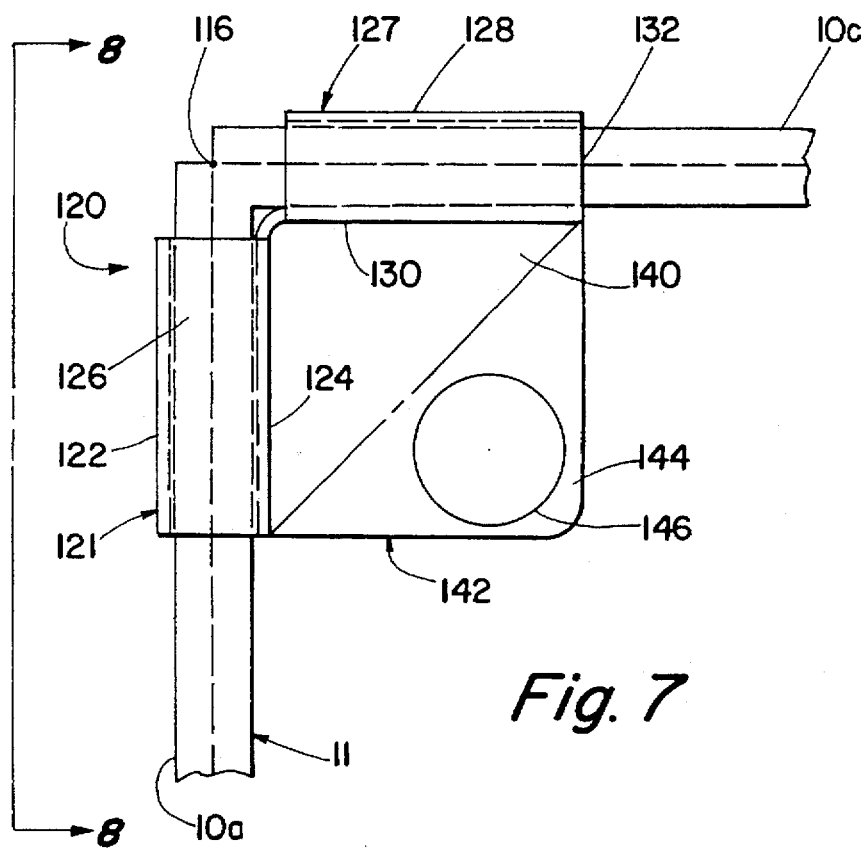
FIG. 7 shows a top view of the bracket of the FIG. 5 embodiment installed on the uppermost corner of the container.
Figure 8:
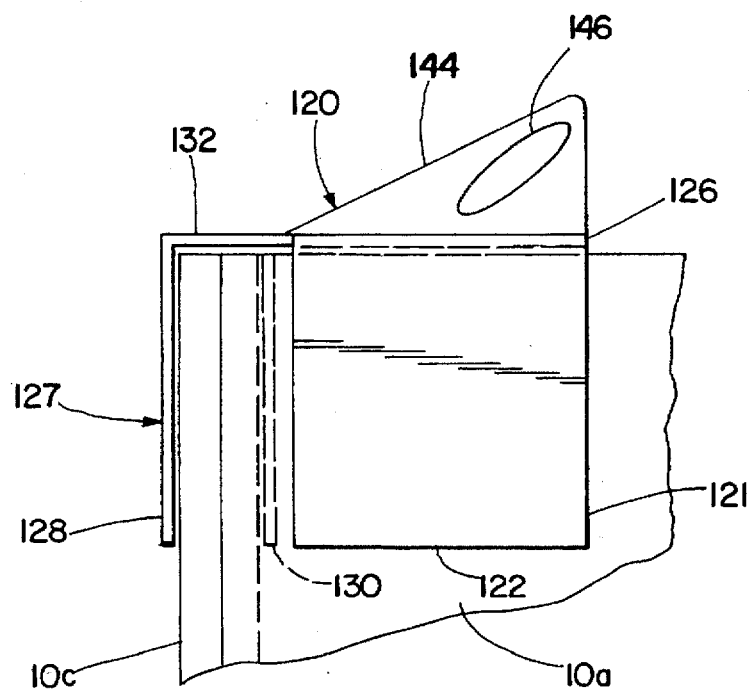
FIG. 8 shows a side, elevational view taken along line 8—8 of FIG. 7 of the bracket installed on the uppermost corner of the container.

Another advantage of the FIG. 5 embodiment is the simplified pick-up tube support bracket 120 best shown in FIGS. 7 and 8. Whereas hand truck 112 and cradle 44a support box 11 with interior corner 11a positioned as the lowest corner, bracket 120 is installed at the highest corner 116 of box 11. In FIGS. 7 and 8, bracket 120 includes a first clip 121 having a pair of legs 122, 124 attached to a top 126, and a second clip 127 having a pair of legs 128, 130 attached to a top 132. Clips 121, 127 are positioned with respect to one another at a ninety-degree angle by attachment to a rearward triangular section 140 of a square pick-up tube support plate 142. The forward triangular section 144 of the tube support plate 142 includes a hole 146 which pick-up tube 54 slides through when installed on box 11, as will be described below. Forward section 144 is bent up 45 degrees so that section 144 is at an approximate 135 degree angle with respect to rearward section 140. The reason for this is that cradle 44a preferably supports box 11 at a 45-degree angle with respect to the floor, and therefore, when bracket 120 is installed on uppermost corner 11b of box 11, as will next be described, forward triangular section 144 is positioned horizontally parallel to the plant floor.

To install bracket 120 to box 11, box 11 is first installed in cradle 44a and then the flaps of the box are opened. The two flaps 10a and 10c which intersect at top corner 116 (See FIG. 7) would then be folded down flat against the outside of box 11 and bracket 120 would be pushed down onto the corner with first clip 121 holding flap 10a down, and second clip 127 holding flap 10c down. In this position, forward triangular section 144 of bracket 120 is held essentially horizontally. Next feed tube 54 is inserted through hole 146 until the bottom 66 of the tube 54 is positioned in the lowermost interior corner 11a of box 11. Next, pump 52 (shown in phantom lines in FIG. 5) is installed onto the top of pick-up tube 54. As in the FIG. 1 embodiment, vibrator 42a and pump 52 are then turned on to completely pump all of the powder coating material out of the box with a minimum of operator attention.

Hole 146 of bracket 120 is slightly oversized with respect to tube 54 to permit bottom end 66 of tube 54 to engage the bottom interior corner of the box regardless of the box's size or shape. For example, box 11, shown in FIG. 5, is essentially cubical so that pick-up tube 54 is substantially vertical. With boxes having substantially different height, width, and length dimensions, the tube 54 would not necessarily be vertical, but instead may be angled somewhat from vertical, but bracket 52 will permit this orientation and it will not effect the operation of the device.

In the FIG. 5 embodiment, tube 54 is preferably metal such as aluminum to reduce static charging effects. That is, triboelectric or frictional charging caused by powder flow through the plastic parts of pump 52 is transferred from pump 52 to tube 54 through O-rings 58a, 58b, which can be constructed from a conductive material, and from tube 54 to bracket 120 due to the metal to metal contact therebetween. Pump 52, tube 54, and bracket 120 are electrically grounded to frame member 113, however, by means of a ground strap 150 preferably placed on tube 54. Frame member 113 of hand truck 112 would in turn be grounded by a ground strap 152 to any suitable ground such as the powder coating booth by a removable spring clip 154 at the end of strap 152.

While the above described embodiment of the invention provides an effective means of automatically unloading an original shipping container filled with paint powder and transferring the powder to a spray gun, under certain conditions, such as when spray gun 59 is turned on and off, the powder pick-up tube 54 would become clogged with a plug of compacted powder. This problem occurred because the powder, remaining in pick-up tube 54 after spray gun 59 was turned off, collected at the bottom of pick-up tube 54 and tended to compact itself because of the vibration of the surrounding powder. When spray gun 59 was turned on again, the pump 52 was not able to draw air through the compacted powder to fluidize the powder so that it could be drawn through pick-up tube 54 and into pump 52.

Figure 9:
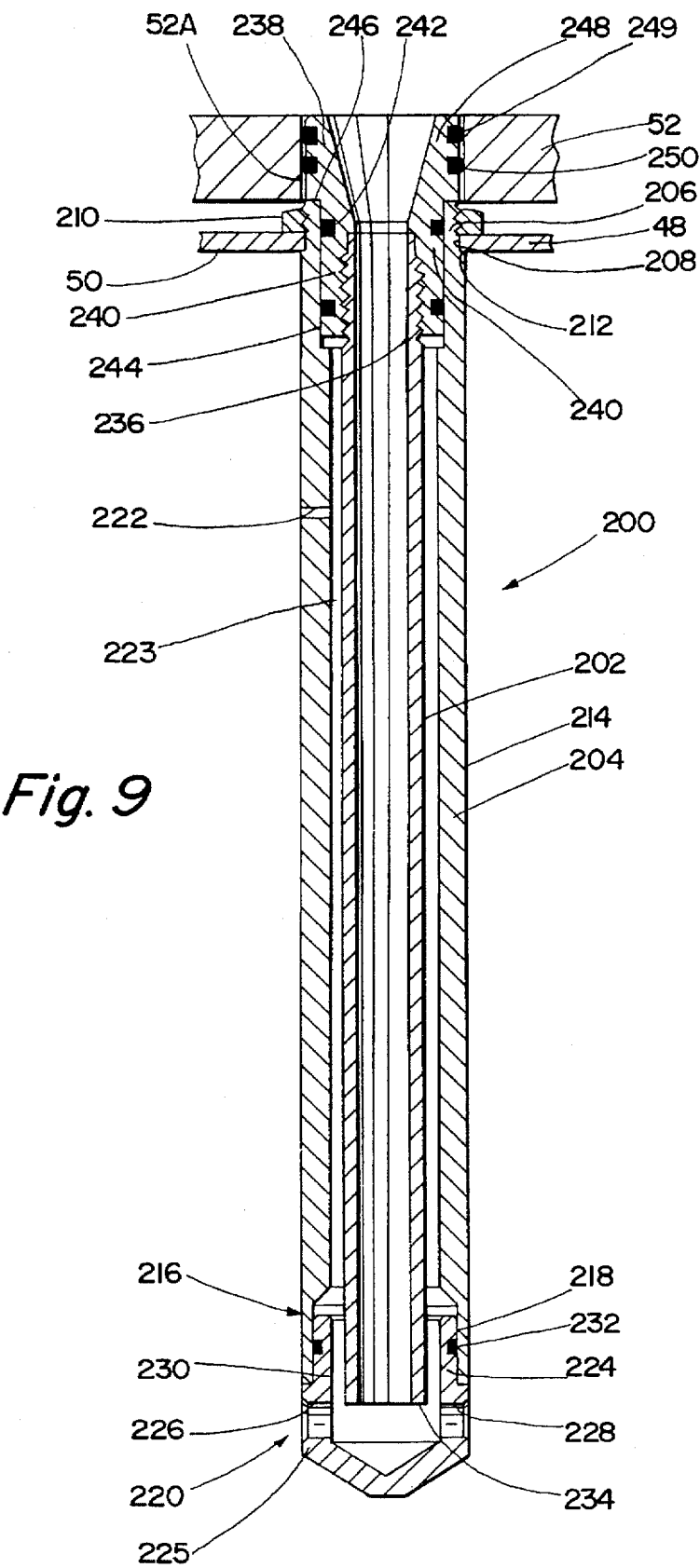
FIG. 9 shows an elevational view in cross section of an alternative embodiment of a suction tube in accordance with the invention.

An additional embodiment, as illustrated in FIG. 9, incorporates a pick-up tube 200 which substantially eliminates the problem of powder compacting when powder pump 52 is turned off. Pick-up tube 200, having concentric inner and outer tubes 202 and 204, is securely mounted to end 50 of arm 48.

An exemplary mounting, as shown, is provided by inserting a threaded end section 206 of outer tube 204 through a hole 208 in end 50. A nut 210 is threaded onto the threaded end section 206 to abut shoulder 212 at the intersection of end section 206 and the central section 214 of outer tube 204 against the lower surface of arm 48 so that pickup tube 200 is securely mounted. The lower end section 216 of outer tube 204 has an enlarged inner diameter 218 to receive an end fitting 220 as discussed below. A small vent hole 222 to atmosphere is provided in the central section 214 of outer tube 204 so that atmospheric air can be drawn in to the annular space 223 between the inner and outer tubes 202 and 204 to fluidize the compacted powder as discussed below. The size of vent hole 222 is selected so that air flow therethrough is not too restricted to prevent air flow through compacted powder or too great so that powder flow through inlet holes 226 and 228 is so reduced that primarily air is pumped through pickup tube 200. For example, vent hole 222 can have a diameter of between about 0.04 and 0.08 inches and preferably about 0.06 inches.

End fitting 220 is constructed with an upper section 224 having an outer diameter which forms a tight fit with the enlarged inner diameter 218 of lower end section 216. A lower section 225 of end fitting 220 has cross inlet holes 226 and 228 which open to the bore 230. The bottom end of end fitting 220 is closed to prevent the plastic liner in the shipping container from blocking inlet holes 226 and 228. A seal 232 can be provided in the outer wall of upper section 224 to secure end fitting 220 into the lower end section 216 of pickup tube 204. While two inlet holes are illustrated in end fitting 220, it is within the terms of the invention to use only a single inlet hole or additional inlet holes if desired. Further, while the bottom end of end fitting 220 is closed, it is within the terms of the invention to provide an opening through the closed end.

Turning now to the construction of the inner tube 202, a lower end 234 is aligned with the uppermost portion of holes 226 and 228 to allow unrestricted powder flow through inlet holes 226 and 228 and into tube 202.

The upper end 236 of inner tube 202 has a pump insertion fitting 238 which has a lower section 240 that fits tightly into an inlet bore 244 of outer tube 204. Pump insertion fitting 238 can be removably pressed into the inlet bore 244 of outer tube 204 until a shoulder 246 formed at the intersection of lower section 240 and an upper section 248 rests against the outer end wall of outer tube 204. Pump insertion fitting 238 carries a pair of o-rings 249 and 250 which are frictionally received within a bore 52A in the bottom of pump 52 to prevent air leaks as discussed regarding tube 54 illustrated in FIG. 3.

Annular space 223 between outer tube 204 and inner tube 202 is sized so that air flow from vent hole 222 through annular space 223 and into inner tube 202 is unrestricted. For example, the outer diameter of inner tube 202 is about 0.5 to about 0.6 inches and the inner diameter of outer tube 204 is about 0.7 to about 0.8 inches.

In operation, pump 52 draws powder up and out of box 11 and through inlet openings 226 and 228 at the lower end of pick-up tube 200. The powder flowing up inner tube 202 is drawn through pump 52 for delivery to a spray gun 59 as discussed before. At the same time, however, air is drawn through vent hole 222 and down annular space 223 to mix with the powder flowing through inlet holes 226 and 228 to pump 52. As explained before, when pump 52 and gun 59 are turned off, and the powder collects at the bottom of end fitting 220, the powder sometimes becomes compacted due to the vibration of the powder in the surrounding container. When gun 59 and pump 52 are turned back on, the end fitting 220 of double tube 200 receives air drawn through the vent hole 222. The air eats away at the compacted powder collected in the bottom of end fitting 220 and promotes fluidization to break up the plug of powder so that powder begins to again flow from the container to pump 52.

It is apparent that there has been provided in accordance with this invention an apparatus and method for unloading powder from a container that satisfies the objects, means, and advantages set forth hereinbefore. For example, while the invention has been described in its most preferred embodiment wherein the container is tilted with the lowermost interior portion of the container being a corner, it is within the scope of the invention to provide a cradle which tilts the container on an edge so that the lowermost interior portion of the container is an entire edge, and one or more pick-up tubes are used along the edge, or a single pick-up tube which is split into branch pick-up tubes arrayed along the edge is used to evacuate powder along the entire edge.

While the invention has been described in one preferred embodiment and in one alternative embodiment, it is evident that many other alternatives, modifications, and variations will be apparent to those skilled in the art in light of the foregoing description. Accordingly, the invention is intended to embrace all such alternatives, modifications, and variations as fall within the spirit and scope of the appended claims.

We claim:

1. A manual powder coating system comprising:
   a support structure having wheels for moving said support structure;
   a cradle mounted to said support structure for supporting a boxed-shaped container containing powder in a tilted position at an angle with respect to horizontal, said boxed-shaped container having a lowermost interior portion in said tilted position;
   a vibrator attached to said cradle for vibrating and loosening said powder thereby causing said powder to move by gravity towards said lowermost interior portion of said boxed-shaped container;
   vibration isolation mounts between said cradle and said support structure to dampen vibration transferred from said cradle to said support structure;
   a pick-up tube having a lower inlet end with at least one inlet opening adapted to being positioned within said box-shaped container in said lowermost interior portion and an upper outlet end for discharging the powder;
   a powder pump associated with said upper outlet end of said pick-up tube for drawing the powder from said box-shaped container into said lower inlet end of said pick-up tube and discharging said powder from said upper outlet end of said pick-up tube;
   a spray gun connected to said powder pump for applying the powder drawn from said box-shaped container;
   a control housing mounted to said support structure for operating said powder pump and said vibrator; and
   a support arm extending outward from said control housing to project over said box-shaped container.

2. The manual powder coating system of claim 1 wherein said support arm has a hole aligned with said lowermost interior portion of said box-shaped container, said hole receiving said pick-up tube and supporting said pick-up tube in a substantially vertical orientation.

3. The manual powder coating system of claim 2 wherein said lowermost interior portion of said box-shaped container is a corner.

4. The manual powder coating system of claim 1 wherein said lower inlet end of said tube is closed.

* * * * *